Aug. 1, 1939.  E. WOERNER  2,168,110

CHAINLESS CYCLE WITH PEDAL LEVERS

Filed June 10, 1938  2 Sheets-Sheet 1

Inventor:
E. Woerner
By Glascock Downing & Seebold
Attys.

Aug. 1, 1939.                E. WOERNER                 2,168,110
            CHAINLESS CYCLE WITH PEDAL LEVERS
              Filed June 10, 1938          2 Sheets-Sheet 2
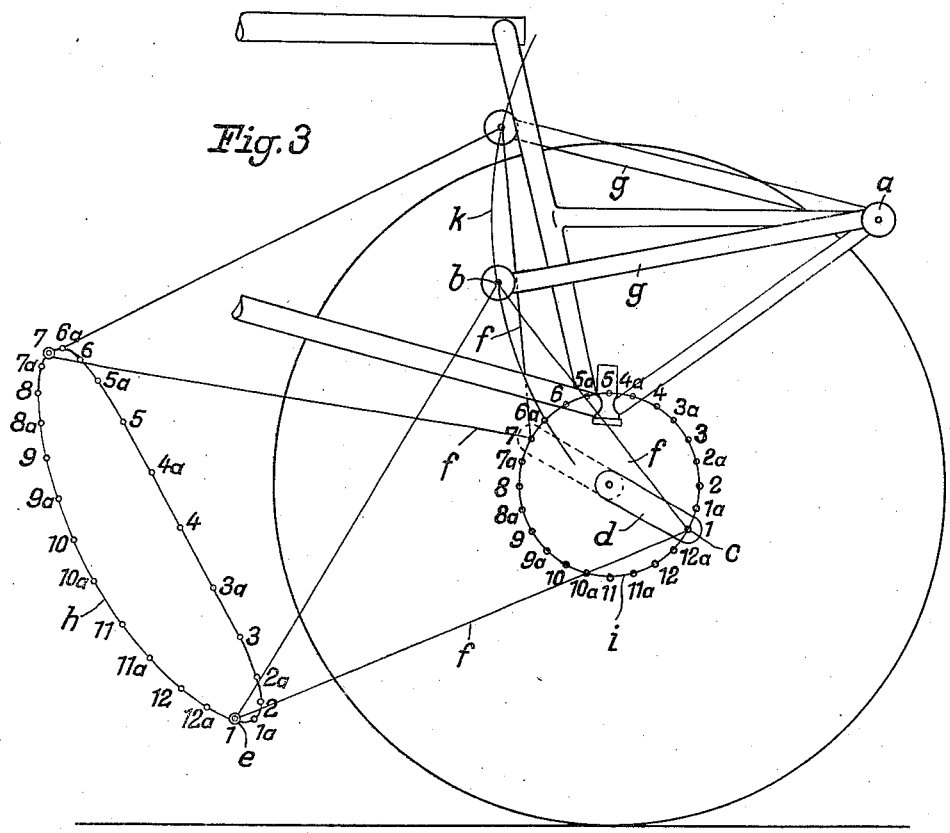
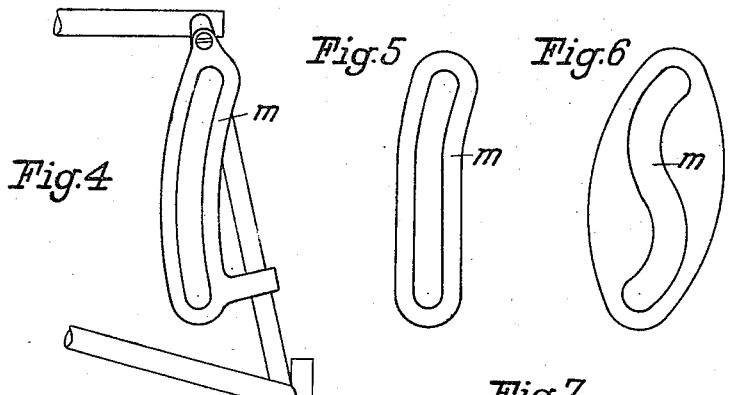
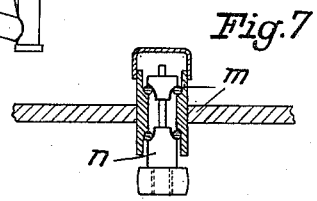
Inventor:
E. Woerner
By: Glascock Downing & Seebold
Attys.

Patented Aug. 1, 1939

2,168,110

UNITED STATES PATENT OFFICE 2,168,110

CHAINLESS CYCLE WITH PEDAL LEVERS

Eugen Woerner, Stuttgart-Feuerbach, Germany

Application June 10, 1938, Serial No. 213,084
In Germany June 30, 1937

6 Claims. (Cl. 280—256)

This invention relates to a chainless cycle with pedal levers, which carry at their front ends the pedals or foot rests, are rotatable on cranks supported at the centre of the rear wheel and preferably making an angle of 180 degrees with one another, and are linked by swinging members or slide in guides in such a way that the pedals describe conchoidal pedalling paths closed in themselves.

Such cycle-propelling mechanisms, with guidance by means of swing members arranged behind the crank circle, are in themselves known. In one of these known constructions, with cranks at 180 degrees apart, in the vertical position of the cranks, that is, when one crank pin is in its highest and the other in its lowest position, one pedal is likewise in its highest position and the other in its lowest. This gives rise to the disadvantage that the rider may unintentionally back-pedal with the pedal that is in its uppermost position, and thereby brake the cycle. This disadvantage occurs particularly when there is a freewheel mechanism in the rear wheel, for then the forward force which is exerted upon the cranks by the rear wheel continuing to revolve, and which would carry the pedals beyond their uppermost point, is absent. Conditions are similar in another known construction of the type hereinbefore mentioned with the cranks 180 degrees apart. In this construction only the pedal located on one side of the rear wheel has already passed beyond its highest point when the other reaches its lowest point, whereas the pedal located on the other side only just arrives in its highest position when the opposite pedal reaches its lowest position. The risk of unintentional back-pedalling is therefore still not overcome even with this construction.

The present invention remedies this by constructing the drive in such a way that at the lowest position of either of the two pedals, the other has already passed beyond its highest position. For when one pedal has reached its highest position, the other has not yet reached its lowest position, and can therefore still be depressed, and carries the first pedal reliably beyond its uppermost point. Other important advantages are also obtained.

The invention is illustrated by way of example in the accompanying drawings, in which—

Figure 3 is a more diagrammatic side view on a larger scale showing only the essential parts of the form of construction illustrated in Figure 2;

Figures 4, 5 and 6 show by way of example modifications of the embodiment represented in Figures 2 and 3, the swinging links being replaced by slot guides of various shapes; and Figure 7 shows in cross section one form of construction of the bearing of the rear end of the pedal lever in a slot guide.

Figure 1:
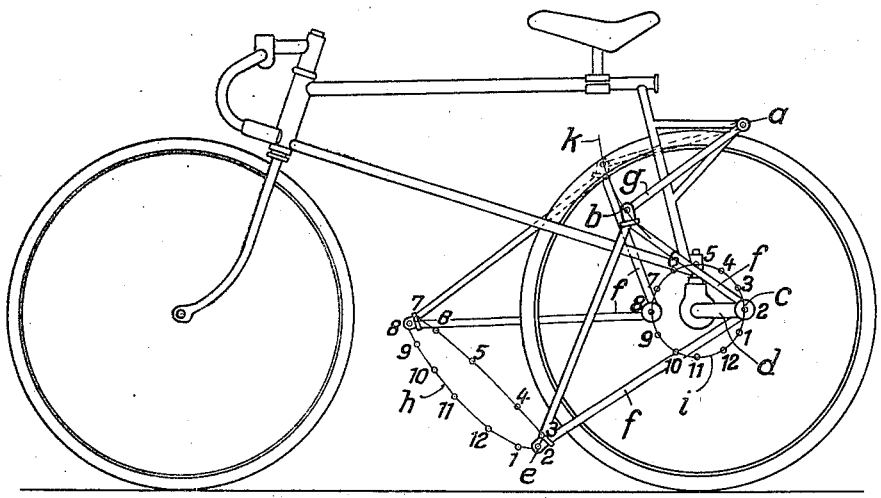
Figures 1 and 2 are side views of complete bicycles showing two embodiments of the invention with swinging links.
Figure 2:
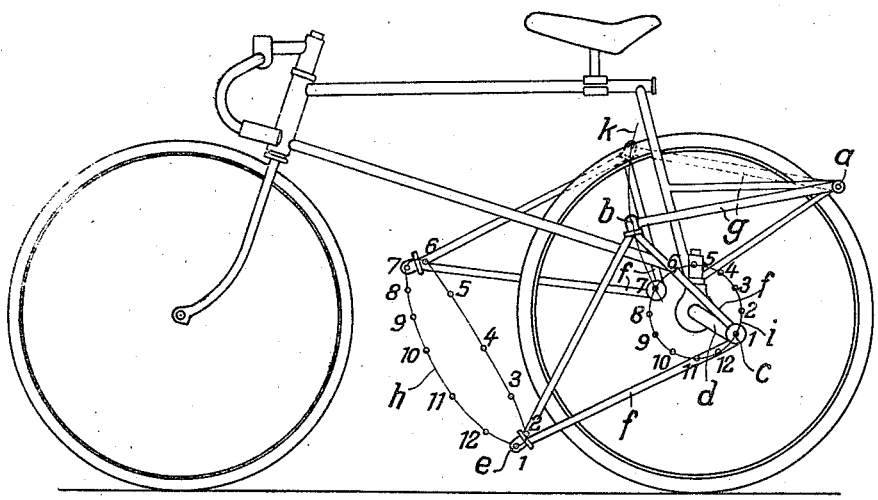

In Figures 1, 2 and 3 the pedal levers having the same form and the same dimensions, and arranged one on each side of the rear wheel, are denoted by $f$. They are triangular in shape, the front upper side being provided merely for the purpose of stiffening the other two sides of the triangle. The pedals or foot rests are arranged at the front ends $e$ of the triangles. At their upper extremities $b$ the pedal levers are pivotally mounted on swinging links $g$, which in their turn are supported on pivots $a$ on the cycle frame, behind the centre of the rear wheel. By the third angles $c$ the pedal levers are rotatably mounted on the crank pins of two cranks $d$ that are 180 degrees apart on the rear axle. The curved paths $h$ described by the pedals register with one another, and $i$ denotes the circular path of the crank pins. The two paths of movement $h$ and $i$ are correspondingly subdivided in Figures 1 to 3, to enable the corresponding positions of the crank pins and of the pedals, which are similarly numbered, to be found. $k$ denotes the path of oscillation of the swinging links $g$, which is an arc of a circle with its convexity forward.

In the arrangement described, as shown in Figures 1 to 3, particularly in Figure 3, which is on a larger scale than Figures 1 and 2, and in which the subdivision of the paths $h$ and $i$ is carried further, when either of the pedals has reached its lowest position, as shown at point 1 of the pedal path in Figure 3, the other pedal has already passed beyond the highest point of its pedal curve, 6a in Figure 3, and is already located at the point 7 in the front or descending portion of the pedal curve. As already stated above, the risk hitherto experienced of unintentional back-pedalling is thereby reliably obviated, and the uninterrupted forward movement of the bicycle ensured. Furthermore, since both pedals are in action and are doing useful work at the same time in the portions 6a to 7 and 12a to 1 (Figure 3) of the paths of the pedals, the rider's legs relieve one another, thereby tiring him less, and enabling him to continue riding longer. The machine is exceedingly light.

Hill-climbing and head winds can easily be overcome with it. For the same expenditure of effort there is a greater output of useful work than with the crank drive hitherto usual.

That at the lowest position of each pedal the other pedal has already passed beyond its highest point appears to be conditioned by the fact that with the two cranks $d$ in a horizontal position, as in Figure 1, or inclined forwards and upwards, as in Figures 2 and 3, the pedal of the pedal lever mounted on the rear crank is located at the lowest point of its path $h$, that is to say, in the usual manner, so low down that for traversing curves there is still sufficient clearance from the ground, and that the paths $k$ of the pedal-lever links are arranged substantially upright above the crank circle, and in the upper portion are bent rearwards. Owing to this deflection, while one pedal is terminating its downward movement the other is carried beyond its highest point.

If slot guides $m$ are provided instead of swinging links for guiding the pedal levers, as illustrated in Figures 4 to 7, it is no longer absolutely essential that these should be in the form of arcs of circles, as in Figure 4, but it will suffice if the upper portion of the guiding path has an arcuate curvature to the rear, as shown for instance in Figures 5 and 6.

The arrangement of the guiding tracks above the crank circle, that is to say, before, within or behind the centre of the rear wheel, has the result that the weight of the pedal lever the pedal of which has reached the uppermost position helps to facilitate the downward movement of this pedal lever. The employment of slot guides instead of swinging links has the advantageous result that a simpler and more stable and compact structure is obtained, which ensures a more restful position for the cycle, particularly in traversing curves.

Figure 8 shows a pin $n$, mounted on the end $b$ of the pedal lever, and resting in the guide $m$ with two ball bearings.

The movement of the crank shaft is transmitted to the rear wheel hub preferably by means of a wheel transmission. In consequence of the advantageous utilisation of effort a greater transmission ratio may be provided than has hitherto been usual.

I claim:

1. A chainless cycle, comprising a frame, a rear wheel rotatably mounted in the frame, a pair of cranks rotatable coaxially with the rear wheel, a pair of pedal levers, each pedal lever being pivotally connected at the rear to one of the cranks, a pair of pedals, each pedal being mounted at the front end of one of the pedal levers, and means for guiding a point on each pedal lever in an approximately vertical path located above the level of the crank circle and bent rearwards in its upper portion, the pedal connected with the crank that is for the time being directed towards the rear being at the lowest point of its path when the said crank is horizontal or slightly inclined downwards.

2. A chainless cycle, comprising a frame, a rear wheel rotatably mounted in the frame, a pair of cranks 180 degrees apart rotatable coaxially with the rear wheel, a pair of pedal levers, each pedal lever being pivotally connected at the rear to one of the cranks, a pair of pedals, each pedal being mounted at the front end of one of the pedal levers, and means for guiding a point on each pedal lever in an approximately vertical path located above the crank circle and curved rearwards in its upper portion, the pedal connected with the crank that is for the time being directed towards the rear being at the lowest point of its path when the said crank is horizontal or slightly inclined downwards.

3. A chainless cycle, comprising a frame, a rear wheel rotatably mounted in the frame, a pair of cranks rotatable coaxially with the rear wheel, a pair of pedal levers, each pedal lever being pivotally connected at the rear to one of the cranks, a pair of pedals, each pedal being mounted at the front end of one of the pedal levers, a pair of links, both pivoted at their rear ends to the frame for oscillation about an approximately horizontal position and each pivoted at the front end to one of the pedal levers, the pedal connected with the crank that is for the time being directed towards the rear being at the lowest point of its path when the said crank is horizontal or slightly inclined downwards, and the guiding links for the pedal levers being arranged substantially vertically above the crank circle in such a position that the upper parts of the paths of the moving ends of the links are inclined rearwards.

4. A chainless cycle, comprising a frame, a rear wheel rotatably mounted in the frame, a pair of cranks rotatable co-axially with the rear wheel, a pair of pedal levers, each pedal lever being a bell-crank lever in the form of a triangular frame pivotally connected by a rearwardly directed angle to one of the cranks, a pair of pedals, each pedal being mounted on a forwardly directed angle of one of the pedal levers, the third angle of each lever, constituting the fulcrum, being located substantially above the crank circle, and means for positively guiding this third angle in an approximately vertical curved path.

5. A chainless cycle, comprising a frame, a rear wheel rotatably mounted in the frame, a pair of cranks 180 degrees apart rotatable co-axially with the rear wheel, a pair of bell-crank pedal levers, each pivotally connected by a rearwardly directed angle to one of the cranks, a pair of pedals, each pedal being mounted on a forwardly directed angle of one of the pedal levers, the third angle of each lever, constituting the fulcrum, being located substantially above the level of the angles connected with the cranks and with the pedals, and means for positively guiding this third angle in an approximately vertical curved path.

6. A chainless cycle, comprising a frame, a rear wheel rotatably mounted in the frame, a pair of cranks rotatable co-axially with the rear wheel, a pair of bell-crank pedal levers, each pivotally connected by a rearwardly directed angle to one of the cranks, a pair of pedals, each pedal being mounted on a forwardly directed angle of one of the pedal levers, the third angle of each lever, constituting the fulcrum, being located substantially above the crank circle, and a pair of links, each pivotally connected at its front end to the third angle of one of the pedal levers, and each pivoted by its rear end to the cycle frame for oscillation about an approximately horizontal position.

EŪGEN WOERNER.